United States Patent [19]

Eustache et al.

[11] Patent Number: 4,597,129
[45] Date of Patent: Jul. 1, 1986

[54] WINDSCREEN WIPER DEVICE

[75] Inventors: Jean-Pierre H. Eustache, Antony; Daniel L. Maubray, Issy-les-Moulineaux, both of France

[73] Assignee: Equipements Automobiles Marshall, Issy-les-Moulineaux, France

[21] Appl. No.: 684,713

[22] Filed: Dec. 21, 1984

[30] Foreign Application Priority Data

Dec. 26, 1983 [FR] France ................. 83 20768

[51] Int. Cl.$^4$ ............... B60S 1/22; B60S 1/24
[52] U.S. Cl. ................... 15/250.16; 74/70
[58] Field of Search .......... 15/250.16, 250.17, 250.19; 74/70, 75, 600

[56] References Cited

U.S. PATENT DOCUMENTS

| 3,716,887 | 2/1973 | Bellware | 15/250.17 |
| 4,400,844 | 8/1983 | Hayakawa | 74/75 X |

FOREIGN PATENT DOCUMENTS

| 873802 | 4/1953 | Fed. Rep. of Germany | 15/250.17 |
| 2900166 | 7/1979 | Fed. Rep. of Germany | 15/250.16 |
| 2943966 | 5/1981 | Fed. Rep. of Germany | |

*Primary Examiner*—Peter Feldman
*Attorney, Agent, or Firm*—Brisebois & Kruger

[57] ABSTRACT

A windscreen wiper device comprises a drive crank 6 mounted fast on a drive shaft 7 of a drive motor, a connecting rod 5 pivotally mounted on said drive crank by means of a crank pin means, and a windscreen wiper blade support arm 2 connected to said connecting rod 5 so that rotation of said drive crank 6 by said drive motor rotating in a first direction sweeps said support arm 2 through a predetermined arc. Means is provided for displacing said crank pin means between a first position, which is proximal of said drive shaft 7, to a second position, distal of said drive shaft 7, and means for locking said crank pin means in said first or second position, said displacing means releasing said locking means and displacing said crank pin means from said first to said second position whereat it is locked by said locking means when said motor rotates in a direction opposite to said first direction, and releasing said locking means and displacing said crank pin means from said second position to said first position whereat it is locked by said locking means when said motor rotates in said first direction.

15 Claims, 14 Drawing Figures

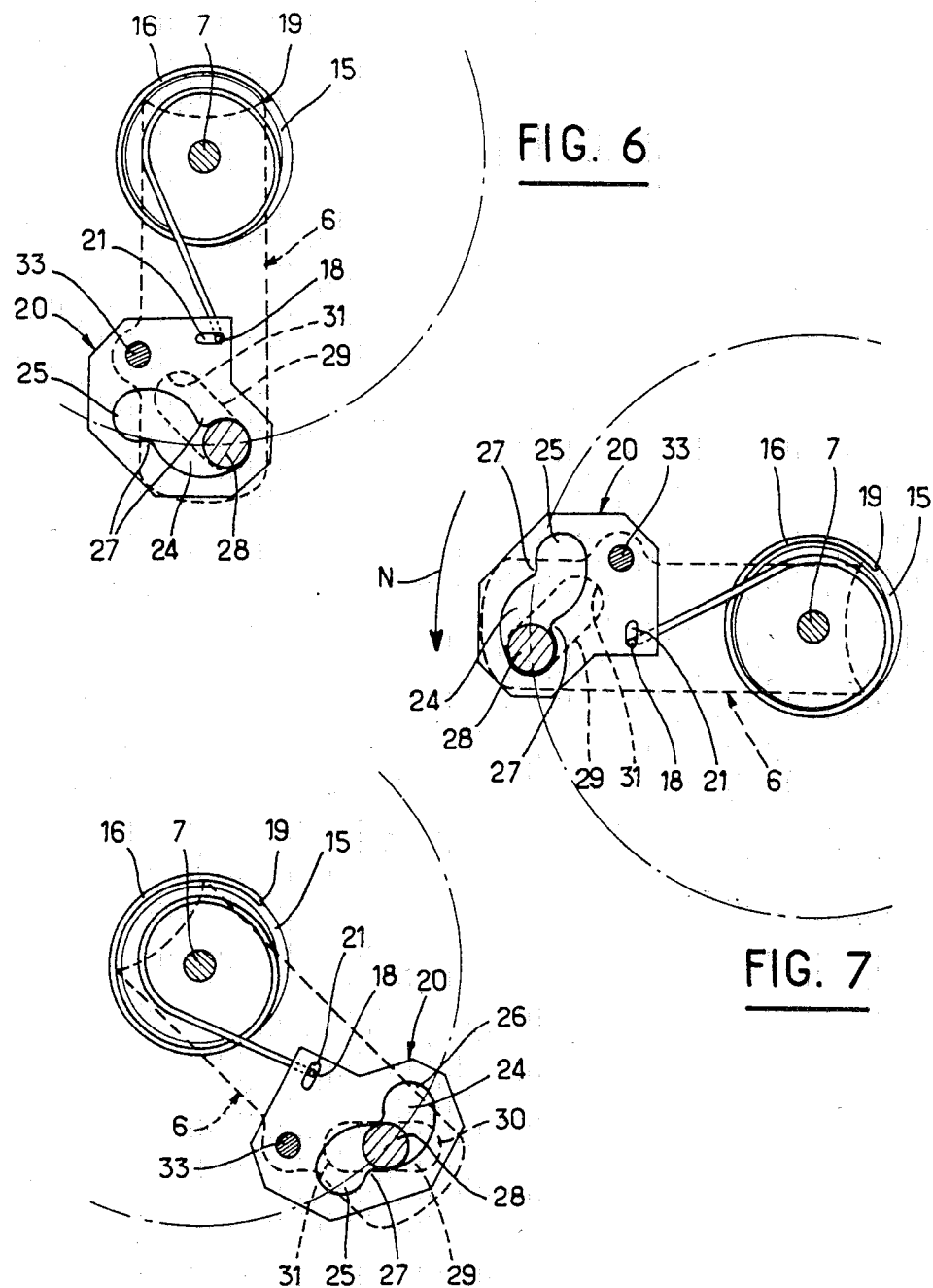

WINDSCREEN WIPER DEVICE

The present invention relates to windscreen wiper devices, and in particular to a mechanism for changing the working width of the linkage connecting a drive motor to a blade support arm of a windscreen wiper, so that the arm and the corresponding blade may be disposed in a stop position, also known as a "parking" position, located outside of the angular sector swept by the windscreen wiper during normal operation. The windscreen wiper in the stop position may then be retracted beneath a bodywork component.

The invention relates more precisely to windscreen wiper devices of the type comprising a reversible motor on the shaft of which there is rigidly mounted a drive crank in the vicinity of a first end, the said drive crank being connected, in the vicinity of a second end, to a connecting rod mounted pivotably on a receiver crank which causes a windscreen wiper blade support arm to rotate about a fixed axis such that the rotation of the motor in a first, or normal, direction is converted into an alternating angular movement of the blade support arm about the fixed axis over a normal sweeping sector, one end of which is a fixed stop position, the device also comprising a mechanism for changing the working width of the connecting rod and the drive crank which may be actuated following a change in the direction of rotation of the motor, this mechanism controlling, when the motor moves from the normal to the reverse direction, the extension of the said working width and therefore the location of the blade support arm is an angular rest position located at the exterior of the sweeping sector and controlling the return to the initial working width when the motor is again rotating in the normal direction from the said angular rest position which is external to the normal sweeping sector, the said mechanism for changing the working width comprising a crank pin on which the connecting rod is articulated, this crank pin being mounted such that it may be displaced along a path having a radial component with respect to the crank, and a locking mechanism designed to lock the crank pin against a first stop which is relatively close to the motor shaft or against a second stop which is relatively remote from the motor shaft, in accordance with the direction of rotation of the motor,- the locking mechanism comprising a lock mounted pivotably with respect to the crank about an axis parallel to the motor shaft, the lock being held in position by a resilient assembly.

A windscreen wiper device of this type is desclosed in the German Specification No. 29 43 966. In this publication, the mechanism for changing the working width of the connecting rod actuates a catch which, during the rotation of the motor in the direction opposite to the normal direction, abuts mechanically against the nose of a type of lock articulated on the crank, and therefore causes the extension of the working width of the crank. The mechanical abutment of the catch and the nose of the lock is opposed to the continuation of the movement of rotation of the electric motor in the direction opposite to the normal direction, and it is therefore necessary for the electrical supply of this motor to be cut off synchronously with the mechanical abutment in order to prevent damage to the motor. During use, a time lag may be produced between the mechanical abutment action and the control of the electrical shutdown of the motor which may lead to drawbacks.

In addition, the repeated impacts due to the abutment of the nose of the lock against the catch do not facilitate smooth and long-term operation of the device and impacts of this type create noise.

SUMMARY OF THE INVENTION

The object of the invention is to provide a windscreen wiper device of the type described above which does not have, or which reduces, the drawbacks set out above and which is, in addtion, has a relatively simple and economic structure, whilst enabling smooth and silent operation.

The invention provides a windscreen wiper device comprising: a reversible electric motor having a drive shaft; a drive crank mounted fast at one end thereof on the drive shaft; a connecting rod pivotally attached at one end thereof to a second end of the drive crank; a receiver crank pivotally attached to a second end of the connecting rod, which receiver crank is connected to a windscreen wiper blade support arm to rotate the the support arm about a fixed axis; and a mechanism for changing the effective width of the connecting rod and drive crank following a change in direction of rotation of the motor, whereby rotation of the motor in a first or normal direction causes reciprocating movement of the blade support arm over an arc about the fixed axis, one edge of said arc being a fixed stop position, and rotation of the motor in a direction opposite to the normal deirection moves the blade support arm to a rest position located outside of and adjacent said arc, said effective width controlling mechanism comprising: a crank pin on which said connecting rod is articulated, said crank pin being displaceable along a radial component with respect to said crank; and a locking mechanism for locking the crank pin against a first stop relatively near the motor shaft and against a second stop relatively remote from the motor shaft in accordance with the direction of rotation of said motor shaft, said locking mechanism comprising a lock which is pivotally mounted with respect to the crank about a spindle parallel to the motor shaft and which is positioned by means of a resilient assembly; the improvement wherein the lock is disposed between the motor and the drive crank; and, when the motor rotates in the normal direction, the resilient assembly tends to rotate the lock about its axis of articulation in a direction so that the crank pin or a component fast therewith is locked against the first stop, the resilient assembly being acted upon following the change of the direction of rotation of the motor so as to rotate the lock about its axis of articulation , with respect to the drive crank, in the direction which unlocks the crank pin or a said component fast therewith and enables the displacement of the said crank pin or said component towards the second stop, against which the crank pin or component is locked, the said resilient assembly being unloaded following rotation again of the motor in the normal direction to lock the crank pin or component fast therewith against the stop closest to the motor shaft.

In a preferred embodiment, the resilient assembly comprises a spiral spring disposed about the motor output shaft, in an annular throat provided in a component which is fast with the motor stator, the spring being caused to rotate about the motor shaft by the lock with sufficient friction of the end turn of he spring housed in the throat against the latter, when the motor rotates in the normal direction, for the lock to be stressed about its axis of articulation in a direction which ensures the locking of the crank pin or a component fast with this crank pin against the stop closest to the motor, whereas during rotation of the motor in the opposite direction, the spring is loaded and causes the lock to pivot about its axis of articulation with respect to the drive crank such that the crank pin is unlocked and is displaced with a radial component wiht respect to the crank pin so that it is brought to abut and is locked against the stop which is remotest from the motor shaft.

The throat may comprise a housing forming a stop against which the end of the turn of the spring is designed to be braced during the rotation of the motor in the reverse direction.

The housing forming the stop is advantageously disposed angularly such that the bracing effect is produced following approximately half a turn of rotation of the motor in the reverse direction.

The above-mentioned stop may be formed by a hole provided in the base of the throat, and the end of the spring housed in the throat is inclined towards the base of this throat such that the inclined end of the spring is or is not locked in the hole according to whether the motor is rotating in the normal or in the opposite direction.

The turns of the spring may surround the motor output shaft such that the spring is loaded by unwinding of the turns and unloaded by winding of the turns The mechanism for changing the working width may comprise an oblong slot provided in the drive crank in the vicinity of the second end thereof, this slot being disposed such that , in the normal direction of rotation of the motor, the crank pin, which is engaged in the oblong slot, is caused to rotate by the end of the oblong slot forming the stop closest to the axis of rotation and such that the inversion of the direction of rotation of the motor displaces the crank pin in the oblong slot until it is caused to rotate by the end of the oblong slot which constitutes the second stop furthest from the axis of rotation of the drive crank, the lock being pivotally mounted on the drive crank about an axis different to the motor shaft.

The oblong slot is inclined with respect to the longitudinal axis of the crank. The angle of inclination between the axis of the oblong slot and the longitudinal axis of the drive crank is advantageously between 10° and 80°.

In accordance with a further possibility, the crank pin may be mounted on a slide which may be radially desplaced on the crank, whilst the lock comprises an arm which is pivotably mounted with respect to the crank about an axis which merges with the drive shaft.

In general, the slide comprises, on the side of the lock, at least one pin designed to cooperate with the said first and second stops.

The lock arm preferably comprises an opening on each of its longitudinal edges, the two openings being radially offset with respect to one another so as to form the said first and second stops, the said slide comprising two pins themselves radially offset and designed to cooperate with each opening in accordance with the relative angular position of the lock and the crank, the said openings comprising a ramp so as to facilitate the entry or with drawal of the pin during the relative movement of rotation between the lock and the crank.

BRIEF DESCRIPTION OF THE DRAWINGS

FIGS. 4, 5 and 6 are views similar to FIG. 3, showing respectively when a spring is brought into abutment, during unlocking of a small radius position of a drive crank, during locking of the crank in the wide radius position, and during a stage in which the windscreen wiper is brought into a parking position;

FIG. 7 corresponds to the parking position;

FIGS. 8 and 9 correspond respectively to unlocking of the wide radius position and locking of the small radius position of the crank, during return to normal operation;

DESCRIPTION OF THE PREFERRED EMBODIMENT

Figures 1, 2:
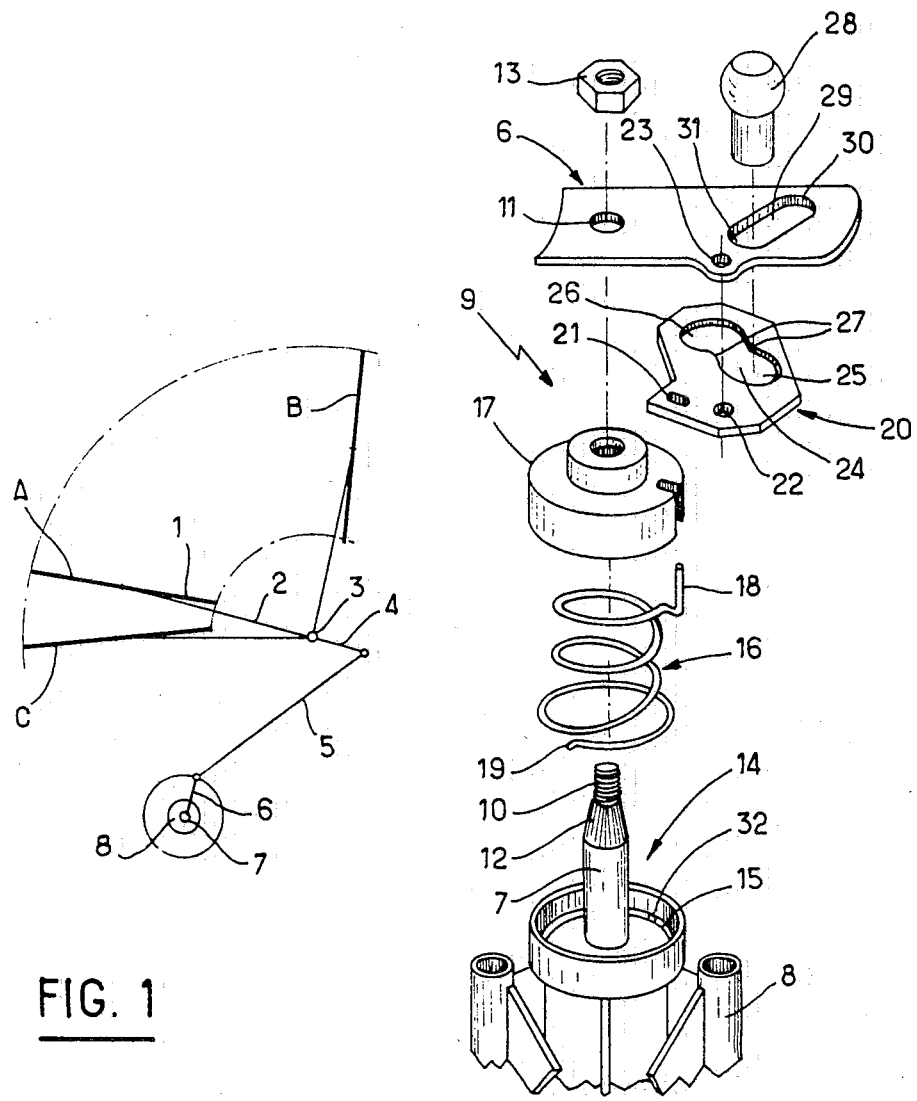
FIG. 1 is a sweeping diagram of a windscreen wiper device according to the invention.
FIG. 2 is an exploded perspective view of a first embodiment of a mechanism for changing the working width of the linkage of the windscreen wiper device of FIG. 1.

In FIG. 1, a windscreen wiper blade 1 is supported by an arm 2 pivoted about fixed point 3. The arm 2 is extended by a receiver crank 4 pivoted on one end of a connecting rod 5 whose other end is connected to drive crank 6 which is caused to rotate by the shaft 7 of a reversible electric motor 8. The pivot connection between the crank 6 and the connecting rod 5 is carried out by a mechanism 9 for changing the working width of the crank 6 which is shown in FIG. 2. During normal operation, the blade 1 is caused to move alternately between the fixed stop position A and the end sweep position B, when the motor 8 is rotating in a normal direction. From the position A, as a result of a single rotation of the motor 8 in the direction opposite to the normal direction, the blade 1 is brought into position B and then poosition C, called the "parking" position, located beyond the fixed stop position A, by means of the mechanism 9. From this position C, rotation of the motor 8 in the normal direction brings the blade 1 into position B, and the blade then returns to position A, and resumes its alternating sweeping movement between the two positions A and B.

Figure 3:
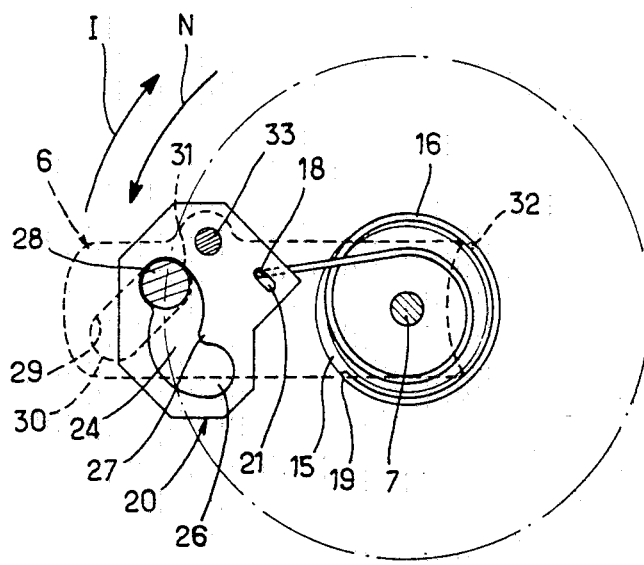
FIG. 3 is a partial and diagrammatic representation of the mechanism of FIG. 2 in a normal operating position.

FIG. 2 shows the motor 8 whose shaft 7 is terminated by a threaded portion 10 having a reduced diameter, and the drive crank 6, only part of which is shown, mounted on the shaft 7 via a gnurled hole 11, which provides for the rigid rotational connection of the crank 6 and the shaft 7 by engagement with the conical grooved bearing surface 12 provided on the shaft 7 between the threaded end 10 and the smooth portion of the shaft 7. A nut 13 is locked on the threaded end 10 to hold the crank 6 in position. Between the motor 8 and the crank 6 there are interposed, from the bottom upwards, a cylindrical receptacle 14, fixed to the base of the motor 8 and in the upper face of which there is provided a circular throat 15, a spiral spring 16 and a cylindrical cover 17. The spring 16 and the cover 17 are mounted about the shaft 7, and the lowermost turn of the spring 16 is housed in the throat 15, whereas the majority of the other turns are in the cover 17, which is traversed by the upper straightened end 18 of the spring 16. The lower end 19 of the spring is inclined towards the base of the throat 15. By means of its upper end 18, projecting externally from the cover 17, the spring is engaged with a slight play in a small manoeuvring slot 21 provided in a lock 20. This latter is also drilled with a spindle aperture 22 by means of which it is articulated, below the crank 6, about a spindle 33 (FIG. 3) which also traverses a spindle aperture 23 drilled in a laterally projecting lug of the crank 6. The lock 20 also has, on the side of the hole 22 substantially opposite to the manoeuvring slot 21, a second slot 24 having an S shape whose two rounded end sections 25 and 26 are connected on each side by a wedge 27 which projects slightly towards the interior of the S-shaped slot 24. In this S-shaped slot 24 there engages the lower end of a crank pin 28 whose upper end is shaped as a ball for articulating the connecting rod 5 on the crank 6, and the central cylindrical portion of the crank pin 28 passes freely through an oblong slot 29 provided in the end of the crank 6, in a direction which is inclined with respect to the longitudinal axis of the latter, such that one end 30 of the oblong slot 29 is separated from the grooved hole 11 by a distance or radius which is greater than that separating the hole 11 from the other end 31 of the oblong slot 29. As shown in FIG. 3, if, from the position A of the blade, the motor shaft 7 rotates in the normal direction (arrow N), the crank pin 28 is caused to rotate by the crank 6 by being applied against the small radius end 31 of the slot 29, as a result of the direction of inclination of the slot with respect to the longitudinal axis of the crank 6. In addition, the lower end 19 of the spring 16 is inclined in a direction, with respect to the base of the throat 15, such that it can only be locked in a small hole 32 provided, in an indexed position, in the base of the throat 15 when the direction of rotation of the shaft 7 is normal, such that the rotation of the crank 6 with the shaft 7 causes the lock 20 to rotate with the shaft 7, the lock 20 being linked to the crank 6 via the spindle 33, and the rotation of the spring 16 and the cover 17 linked to the lock 20. During this rotation, the spring rotates almost freely in the throat 15, with, however, a limited peripheral and axial friction of its lowermost turn against the base and the walls of the throat 15. This friction is sufficient for the spring 16 to urge the lock 20 to rotate about the axis of articulation 33 on the crank 7 in the same direction as the rotation of the crank 6 about the motor shaft, such that the lock 20 locks the crank pin 28 against the small radius end 31 of the slot 29 via the portion of the end section 25 limited by the corresponding wedge 27 in the S-shaped slot 24. Thus, when the shaft 7 rotates in the normal direction, the moving assembly formed by the crank 6, the lock 20, the crank pin 28, the spring 16 and the cover 17, maintains the position shown in FIG. 3.

Figure 4:
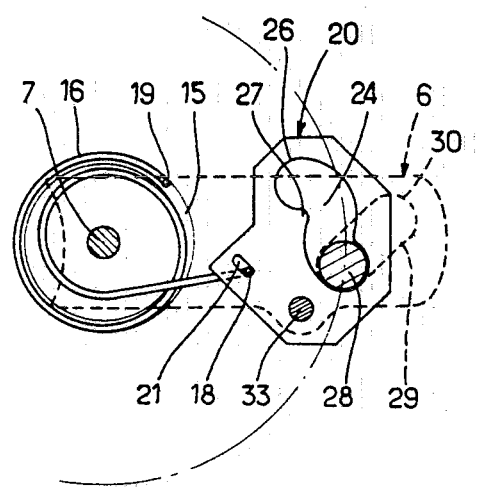
Figure 5:
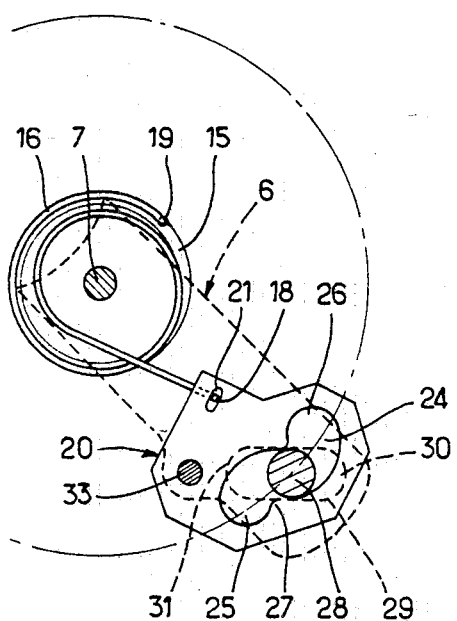

If the shaft 7 performs a single rotation in the opposite direction (arrow I in FIG. 3), from the position A of the blade, the configuration of the moving assembly is not modified during the first half turn, at the end of which the lower inclined end 19 of the spring 16 is caused to lock in the hole 32 at the base of the throat 15, as shown in FIG. 4. From this moment, as the rotation of the crank 6 continues in the opposite direction with the shaft 7, and as it entrains the lock 20 via the spindle 33, the rotation of the lock 20 with the shaft 7 stretches the spring 16 whose turns are urged in the unwinding direction, the lower end 19 of the spring 16 abutting into the hole 32. The spring 16 loaded in this way then causes the lock 20 to rotate about the spindle 33 in the same direction as the direction of rotation of the crank 6 about the motor shaft, as shown in FIG. 5. This rotation of the lock 20 about the spindle 33 firstly ensures the unlocking of the crank pin 28 from the small radius end of the slot 29, by releasing the crank pin 28 from contact with the portion of the section 25 limited by the wedge 27 in the S-shaped slot 24, and as this rotation of the lock 20 continues, the crank pin 28 is brought to abut against the wide radius end 30 of the oblong slot 29 in the crank 6 and is locked in this position by the portion of the other section 26 limited by the wedge 27 in the S-shaped slot 24 of the lock, as shown in FIG. 6. At the end of the rotation in the opposite direction, the movable assembly is in the configuration shown in FIG. 7, in which the crank pin 28 is locked in the wide radius position of the crank 6. The increase of the sweeping angle resulting from the increase of the working radius of the crank 6, during the second half turn in the opposite direction, enables the blade to be disposed in the parking position C of FIG. 1.

In summary, during the first half turn in the opposite direction, the blade passes from the position A to the position B then, during the second half turn, it moves from position B to position C, in which it is locked by the discontinuation of the motor rotation.

It is possible to obtain a similar operation, without the cooperation of the lower end 19 of the spring with a stop, such as that provided by the hole 32 at the base of the throat 15, by providing for the lock 20 to be caused to rotate about the spindle 33 by means of friction of the spring 16 in the throat 15. However, a stop is preferable in order to ensure the loading of the spring and to guarantee the desired rotation of the lock 20.

Figure 9:
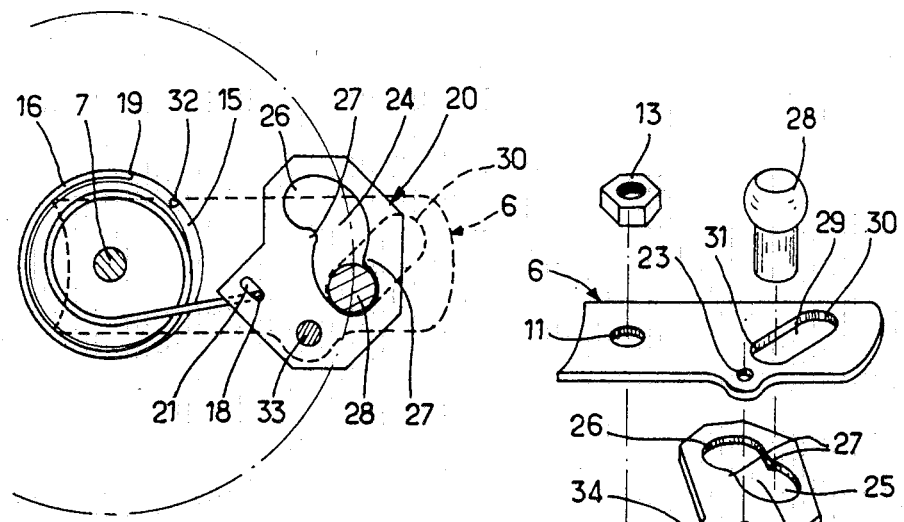

From the parking position, corresponding to the configuration of the moving assembly shown in FIG. 7, a rotation in the normal direction (arrow N) of the shaft 7 during a half turn of the motor causes a rotation of the crank pin 28 which remains locked against the wide radius end 30 of the oblong slot 29 of the crank 6 caused to rotate under the action of the lock 20 acted upon by the spring 16 which is relaxed by winding up of its turns (which have been unwound during the previous stage leading to the parking position by loading the spring 16). The spring 16 tends as it relaxes to rotate the lock 20 about the spindle 33 in the direction opposite to the normal direction of rotation of the shaft 7 and the crank 6, which maintains the crank pin 28 locked in the wide radius position until the time when the spring 16 is sufficiently relaxed and the effort exerted by the end 19 of the spring 16 in hole 32 is zero. This takes place slightly before the end of the first half turn in the normal direction, as shown in FIG. 8, which shows that unlocking then commences by rotation of the lock 20 about the spindle 33 now in the same direction as the crank 6 about the motor shaft, i.e. in the normal direction, under the action of the spring 16 which is no longer stressed since its end 19 no longer abuts into the hole 32, but is subject to slight friction in the throat 15. In this way, as shown in FIG. 9, at the end of the first half turn in the normal direction, the crank pin 28 is again locked against the small radius end of the oblong slot 29 of the crank 6, in a position which it retains until the motor is again driven in the opposite direction, and it can be seen from FIG. 9 that the end of the spring 16 is no longer engaged in the hole 32, but moves on the base of the throat 15. The moving assembly returns to a configuration which is identical to that of FIG. 3 corresponding to normal sweeping of the windscreen wiper between the positions A and B.

Passage from the parking position C to normal operation is therefore obtained by a first sweep from position C to position B, during the first half turn in the normal direction, followed by a sweep from position B to position A, during the subsequent half turn, after which normal sweeping continues between positions A and B.

It should be noted that the positioning of the lock 20 always takes place without any effort on the part of the latter, whatever the direction of rotation of the shaft 7, as, in all cases, the crank pin 28 is positioned in the appropriate end 30 or 31 of the oblong slot 29, bearing in mind the direction of rotation of the crank 6, via the direction in which the resisting forces act.

DESCRIPTION OF OTHER EMBODIMENTS

Figure 10:
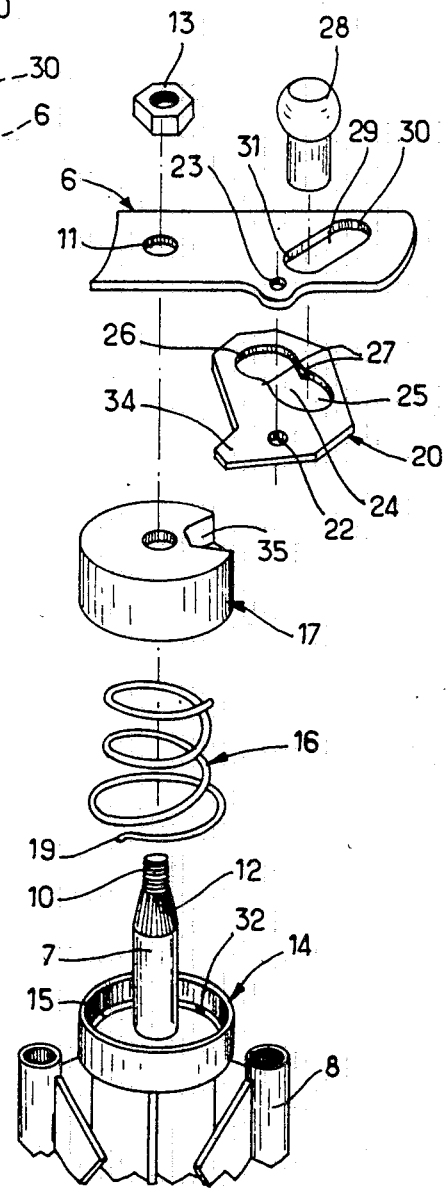
FIG. 10 shows a second embodiment of a mechanism for changing the effective working width of a windscreen wiper device according to the invention.

The variant shown in FIG. 10 only differs from that of FIG. 2 in that the upper end of the spring 16 is no longer engaged in a manoeuvring slot of the lock 20 after passing through the cover 17, but is fixed to the cover 17, and is engaged for example in the small hole in the base of this cover 17, and the action of the spring 16 on the lock 20 is transmitted by a lug 34 of the lock 20 which engages with a small amount of play in an opening 35 provided in the external walls of the cover 17. The operation of this variant is identical to that of the embodiment of FIG. 2.

In FIGS. 11 to 14, a further embodiment of the invention is shown. The components of this embodiment which are identical to or have the same function as components which have already been described with reference to the previous Figures either have the same reference numerals, or are designated by the sum of the respective numeral and 100. The description of these components is not repeated or is referred to very briefly.

The crank pin 128 is mounted on a slide 36 which may be radially displaced on the crank 6. This crank 6 is formed by a flat member whose longitudinal edges are parallel. The slide 36 has, for example, a hollow, rectangular cross-section in which the flat member forming the crank 6 is engaged such that the slide 36 may be displaced in translation on the crank. The crank pin 128 is disposed on the side of the slide 36 opposite to the motor 8. The lock 120, disposed between the motor 8 and the crank 6, comprises an arm 37, for example in the form of a flat, profiled section. This arm 37 is mounted pivotably with respect to the crank 6, about an axis 133 which merges with the motor shaft 7. The axis 133 may therefore be considered to be parallel to the motor shaft 7.

The slide 36 comprises, on the side of the lock 120, and in the vicinity of each respective longitudinal edge, pins 38, 39 designed to cooperate with the respective stops 130, 131. The pins 38, 39 are radially offset, the pin 39 being closer to the axis 133 than the pin 38.

The lock 120 has an opening 40, 41 on each of its longitudinal edges. Each opening opens out transversely with respect to the longitudinal direction of the lock 120. The two openings 40, 41 are offset radially with respect to one another, the opening 40 being further from the axis 133 than the opening 41. As the drawing shows, each opening is limited by two parallel edges perpendicular to the median longitudinal direction of the lock 120. The base of each opening is curved, substantially in the shape of a circular arc.

The edge of the opening 40 located on the side of the axis 133 is connected to the longitudinal edge of the lock 120 by a ramp 42 which is inclined with respect to the longitudinal axis of the lock 120. This ramp 42 is progressively spaced from the other edge of the opening 40 so as to facilitate the entry (or withdrawal) of the pin 38 into the opening 40.

In a similar way, the opening 41 comprises a flared opening limited by a ramp 43 which is inclined with respect to the longitudinal axis of the arm 120. This ramp 43 ensures the connection of the edge of the opening 41 remote from the spindle 133 and the longitudinal edge of the lock 120.

The ramps 42 and 43 may be substantially rectilinear such that the connection contour of the opening and the longitudinal edge of the lock 120 is angular. The openings 40, 41 are oriented in opposite directions.

Figure 11:
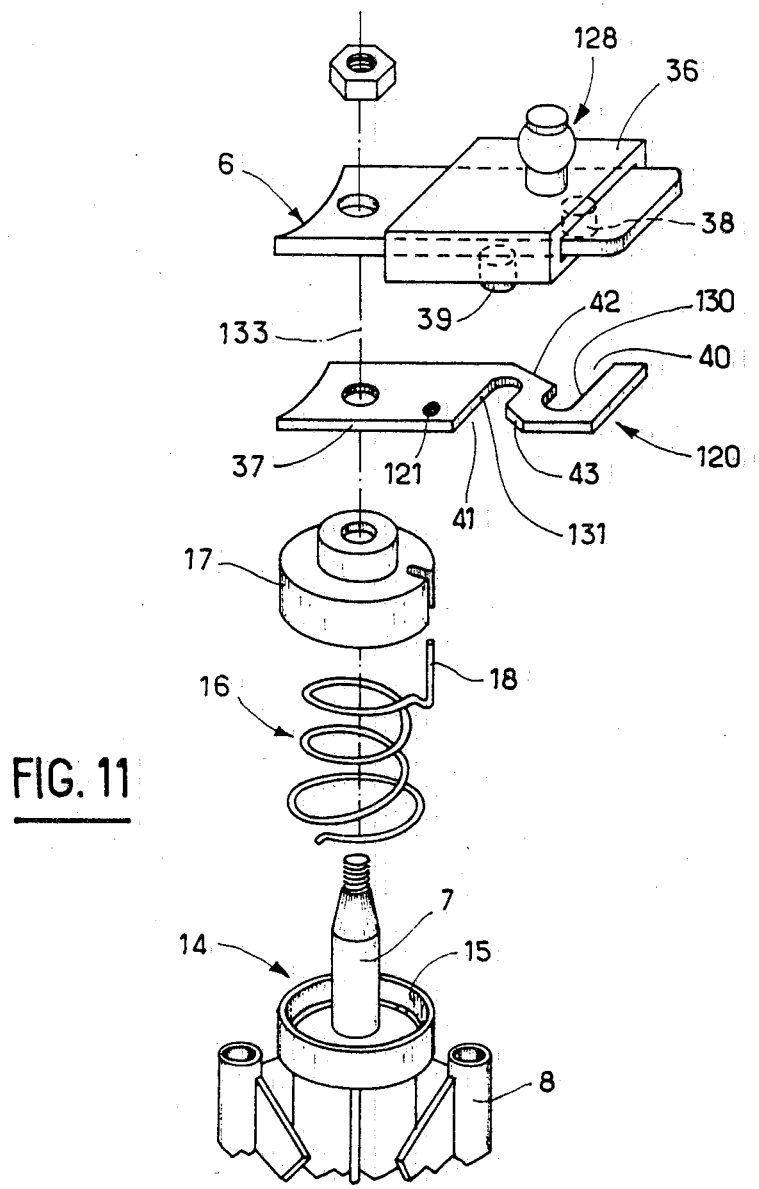
FIG. 11 and shows a third embodiment of a mechanism for changing the working width of a windscreen wiper device according to the invention.

The operation of the device of FIG. 11 is evident from the explanation given above.

Figure 12:
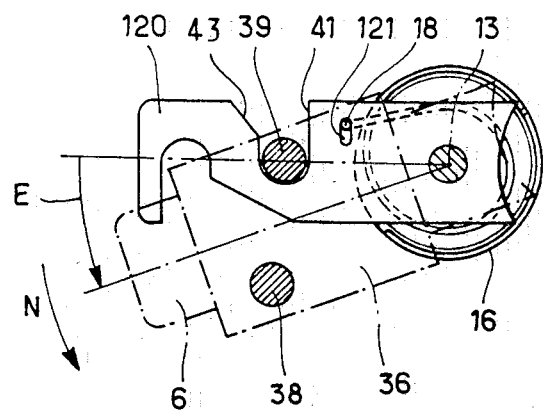
FIG. 12 is a diagram showing the mechanism of FIG. 11 seen from below, when a motor therefor is rotating in a normal direction.

When the motor shaft 7 rotates in the normal direction N, as shown in FIG. 12, the crank 6, which is keyed or otherwise fast on the shaft 7, rotates in the direction N.

The lock 120 which is mounted in a freely rotatable manner with respect to the shaft 7 and the crank 6, is delayed with respect to the crank. In addition, the lock 120 is braked by the spring 16 which rubs against the base of the throat 15. The extension 18 of this spring 16 is in effect engaged in the slot 121 provided in the lock 120.

In these conditions, the rotational drive of the lock 120 is carried out by means of the pin 39 engaged in the opening 41 closest to the spindle 133 (FIG. 12). In the direction of rotation of rotation N, the crank 6 is in advance by an angle E with respect to the lock 120.

The working width of the connecting rod and the drive crank 6, which width corresponds to the distance from the crank pin 128 to the spindle 133, corresponds to the normal operation of the windscreen wipers.

In order to bring the windscreen wiper into the parking position, the direction of rotation of the motor 8 is reversed, and therefore the direction of the rotation of the crank 6, as explained above.

Figure 13:
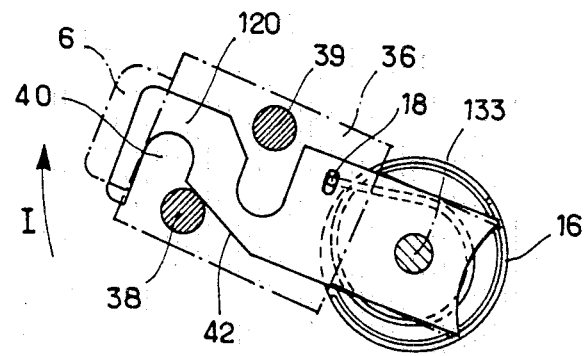
FIG. 13 is a diagram showing the mechanism of FIG. 11 when the motor, which was rotating in the normal direction, begins to rotate in the opposite direction.

FIG. 13 shows the mechanism at the beginning of the movement of inversion.

Before the crank 6 is able to drive the lock 120 in the direction I, it rotates with respect to this lock until the pin 38 cooperates with the ramp 42. As a result of the rotational braking exerted by the spring 16 on the lock 120 and as a result of the inclination of the ramp 42, the pin 38 is subject to the action of a radial component resulting from the effort exerted by the crank 6 on the lock 120, by means of this pin 38. The slide 36, mounted such that it may move freely in translation on the crank 6, is displaced radially towards the exterior, whereas the crank 6 continues its movement of relative rotation with respect to the lock 120.

Figure 14:
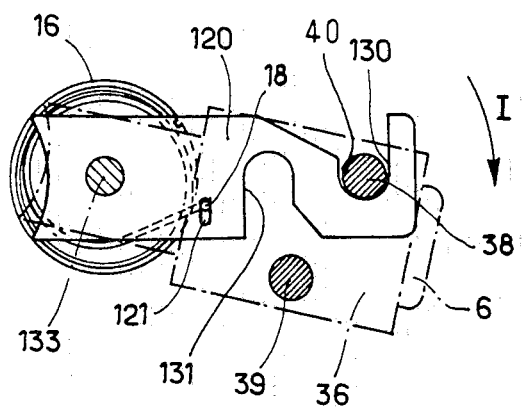
FIG. 14 shows the mechanism of FIG. 11 when the motor is rotating in the opposite direction.

The pin 38 enters completely into the slot 40 and is locked in the curved base of this slot as shown in FIG. 14.

The working width of the connecting rod and the drive crank is thus increased and, when the windscreen wiper reaches the fixed stop position, it occupies position C (FIG. 1) or the parking position.

As explained above, the lower end 19 of the spring 16 may be caused to abut against a stop formed by a hole 32 provided in the throat 15, during this rotation in the reverse direction I. The angular position of this stop 32 is advantageously similar to that described above, i.e. such that the abutment is produced following a half rotation of the motor in the opposite direction I. As a result of this feature, the increase of the working width of the drive crank only actually takes place during the second half of the rotation in the opposite direction of the motor, after the engagement of the end 19 of the spring and the stop 32. This provides a considerable advantage with respect to a device in accordance with which the increase of the working width is obtained from the rocking of an off-centre member which is immediately following by an inversion of the direction of rotation of the motor.

For this reason, the angular clearance of the receiver crank, during the half turn following the inversion of the direction of rotation is controlled by an extended linkage, and the inversion of sweeping takes place at the end of this half turn, in the position which is not an end position of the normal sweep, but is located in the normal sweeping sector such that the final sweeping cycle preceding stoppage in the parking position is incomplete on the side opposite to the parking position, which may be detrimental to visibility. This is not the case for the invention, as the working width of the drive crank is only increased after the final inversion of sweeping at the end position of the normal sweep before the fixed stop in the parking position.

What we claim is:
1. In a windscreen wiper device comprising:
a reversible electric motor having a drive shaft:
a drive crank mounted fast at one end thereof on the drive shaft:
a connecting rod pivotally attached at one end thereof to a second end of the drive crank; a receiver crank pivotally attached to a second end of the connecting rod, which receiver crank is connected to a windscreen wiper blade support arm to rotate the support arm about a fixed axis; and
a mechanism for changing the effective width of the connecting rod and drive crank following a change in direction of rotation of the motor, whereby rotation of the motor in a first or normal direction causes reciprocating movement of the blade support arm over an arc about the fixed axis, one edge of said arc being a fixed stop position, and rotation of the motor in a direction opposite to the normal direction moves the blade support arm to a rest position located outside of and adjacent said arc, said effective width controlling mechanism comprising:
a crank pin on which said connecting rod is articulated, said crank pin being displaceable along a radial component with respect to said crank; and
a locking mechanism for locking the crank pin against a first stop relatively near the motor shaft and against a second stop relatively remote from the motor shaft in accordance with the direction of rotation of said motor shaft, said locking mechanism comprising a lock which is pivotally mounted with respect to the crank about a spindle parallel to the motor shaft and which is positioned by means of resilient assembly;
the improvement wherein: the lock is disposed between the motor and the drive crank; and, when the motor rotates in the normal direction, the resilient assembly tends to rotate the lock about its axis of articulation in a direction so that the crank pin or a component fast therewith is locked against the first stop, the resilient assembly comprising means following the change of the direction of rotation of the motor for rotating the lock about its axis of articulation, with respect to the drive crank, in the direction which unlocks the crank pin or a said component fast therewith and enables the displacement of the said crank pin or said component towards the second stop, against which the crank pin or component is locked, the said resilient assembly being unloaded following rotation again of the motor in the normal direciton to the crank pin or the component fast therewith against the stop closest to the motor shaft.

2. A device according to claim 1, wherein the resilient assembly comprises a spiral spring disposed about the drive shaft of the motor, and positioned in an annular throat formed in a component rigid with the stator of the motor, the spring being rotated about the shaft of the motor by the lock, there being sufficient friction between the lowermost turn of the spring and the throat, when the motor is running in the normal direction, for the lock to be rotated about its axis of articulation, the spring being loaded during a rotation of the motor in the opposite direction and causing the lock to pivot about its axis of articulation with respect to the drive crank such that the crank pin is unlocked and is displaced with a radial component with respect to the crank so that it abuts and is locked against the second stop.

3. A device according to claim 2, wherein the throat comprises a housing having a stop against which an end of the lowermost turn of the spring abuts during the rotation of the motor in the opposite direction.

4. A device according to claim 3, wherein the stop for the spring is positioned so that the abutment takes place after approximately half a turn of the motor in the opposite direction.

5. A device according to claim 4, wherein the stop for the spring is a hole provided in the base of the housing, and the end of the spring is inclined towards the base, of the housing, the inclined end of the spring being locked or not locked in the hole depending on whether the motor rotates in the normal or in the opposite direction.

6. A device according to claim 2, wherein turns of the spring surround the output shaft of the motor so that the spring is loaded by unwinding of the turns and loaded by winding up of the turns.

7. A device according to claim 2, wherein the spring is disposed between the throat and a cover having the shape of a cupola mounted idly on the output shaft of the motor, an end of the spring which is not housed in the throat passing through the cover and being held, with play, in a manoeuvring slot of the lock.

8. A device according to claim 2, wherein the spring is disposed between the throat and a cover having the shape of a cupola mounted idly on the output shaft of the motor, the end of the spring which is not housed in the throat being fixed in the cover which has, in its external wall, an opening in which there engages, with play, a lug rigid with the lock.

9. A device according to claim 1, wherein the mechanism for changing the effective width further comprises an oblong slot provided in the drive crank at the second end thereof, the crank pin engaging in the slot whereby a first end of the oblong slot forms the stop closest to the axis of rotation and in the normal direction of rotation of the motor, the crank pin is caused to rotate by the said first end, and the other end of the oblong slot forms the second stop and, inversion of the direction of rotation of the motor displaces the crank pin in the oblong slot until it is caused to rotate by the second stop, the lock being mounted pivotably on the drive crank about a spindle different from the motor shaft.

10. A device according to claim 9, wherein the oblong slot is inclined with respect to the longitudinal axis of the crank.

11. A device according to claim 10, wherein the angle of inclination between the axis of the oblong slot and the longitudinal axis of the crank is between 10° and 80°3.

12. A device according to claim 1, wherein the crank pin is mounted on a slide which is radially desplaceable on the crank, and the lock comprises an arm pivotable, with respect to the crank about an axis which merges with the motor shaft.

13. A device according to claim 12, wherein the slide comprises, on the side of the lock, at least one pin which cooperates with the said first and second stops.

14. A device according to claim 13, wherein the arm of the lock has two opposed longitudinal edges each having an opening, the two openings being offset radially with respect to one another relative to the drive shaft and forming said first and second stops, said slide comprising two pins radially offset with respect to one another relative to the drive shaft and cooperating with a respective opening, each said opening comprising a ramp to facilitate the entry or withdrawal of the respective pin during relative rotation of the lock and the crank.

15. A windscreen wiper device comprising: a drive motor; a drive crank mounted fast on a drive shaft of said drive motor; a connecting rod pivotally mounted on said drive crank by means of crank pin means and a windscreen wiper blade support connected to said connecting rod so that rotation of said drive crank by said drive motor rotating in a first direction sweeps said support arm through a predetermined arc, wherein there are provided means mounted on and rotatable with the drive means for displacing said crank pin means between a first position, which is proximal of said drive shaft, to a second position, distal of said drive shaft, and means for locking said crank pin means in said first or second position, said displacing means releasing said locking means and displacing said crank pin means from said first and said second position whereat it is locked by said locking means when said motor rotates in a direction opposite to said first direction, and releasing said locking means and displacing said crank pin means from said second position to said first position whereat it is locked by said locking means when said motor rotates in said first direction.

* * * * *